United States Patent
Jeong et al.

(10) Patent No.: US 10,316,903 B2
(45) Date of Patent: Jun. 11, 2019

(54) DOUBLE CLUTCH APPARATUS FOR A TRANSMISSION

(71) Applicants: Hyundai Motor Company, Seoul (KR); Kia Motors Corporation, Seoul (KR)

(72) Inventors: Euihee Jeong, Hwaseong-si (KR); In Tae Park, Hwaseong-si (KR); Jong Min Kim, Busan (KR); Jinwoo Lee, Dongsong-eup (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 128 days.

(21) Appl. No.: 15/717,685

(22) Filed: Sep. 27, 2017

(65) Prior Publication Data
US 2018/0163791 A1 Jun. 14, 2018

(30) Foreign Application Priority Data
Dec. 14, 2016 (KR) .......................... 10-2016-0170787

(51) Int. Cl.
*F16D 21/06* (2006.01)
*F16D 25/10* (2006.01)
(Continued)

(52) U.S. Cl.
CPC .............. *F16D 21/06* (2013.01); *B60K 17/02* (2013.01); *F16D 13/38* (2013.01); *F16D 13/52* (2013.01);
(Continued)

(58) Field of Classification Search
CPC .......... F16D 21/06; F16D 13/52; F16D 21/02; F16D 25/083; F16D 25/08; F16D 25/10; F16D 2021/0661; F16D 13/38; F16D 2021/0669; F16D 25/087; F16D 25/123; F16H 57/0441; F16H 3/006; B60K 2025/022; B60K 17/02
See application file for complete search history.

(56) References Cited

U.S. PATENT DOCUMENTS 7,322,455 B2 * 1/2008 Vetter .................... F16D 21/06
192/212
8,607,950 B2 * 12/2013 Krebs .................... F16D 21/06
192/110 B
(Continued)

*Primary Examiner* — Charles A Fox
*Assistant Examiner* — Lillian T Nguyen
(74) *Attorney, Agent, or Firm* — Morgan, Lewis & Bockius LLP

(57) ABSTRACT

A double clutch apparatus for selectively transmitting a torque of an engine output shaft to first and second input shafts may include a clutch housing connected to the engine output shaft, external and internal clutches radially superposed and respectively connected to the first and second input shafts, first and second operation pistons operated by a dual slave cylinder to respectively operate the external clutch and the internal clutch, a hydraulic pump connected to a driven gear by a rotation shaft, a pump driveshaft disposed coaxially with and external to the second input shaft, the pump driveshaft being formed with a drive gear engaged with the driven gear, and a connecting shaft fixed to a radially internal end portion of the second operation piston and spline-engaged with an internal circumference of the pump driveshaft.

9 Claims, 3 Drawing Sheets

(51) Int. Cl.
  *F16D 13/52* (2006.01)
  *F16D 25/08* (2006.01)
  *B60K 17/02* (2006.01)
  *F16D 13/38* (2006.01)
  *F16D 21/02* (2006.01)
  *F16H 3/00* (2006.01)
  *B60K 25/02* (2006.01)
  *F16H 57/04* (2010.01)

(52) U.S. Cl.
  CPC ............. *F16D 21/02* (2013.01); *F16D 25/08* (2013.01); *F16D 25/083* (2013.01); *F16D 25/10* (2013.01); *B60K 2025/022* (2013.01); *F16D 2021/0661* (2013.01); *F16H 3/006* (2013.01); *F16H 57/0441* (2013.01)

(56) References Cited

U.S. PATENT DOCUMENTS

| | | | |
|---|---|---|---|
| 2011/0259698 A1* | 10/2011 | Arnold | B60K 6/36 |
| | | | 192/48.1 |
| 2011/0290610 A1* | 12/2011 | Arnold | F16D 3/66 |
| | | | 192/48.1 |
| 2015/0083546 A1* | 3/2015 | Moser | B60K 6/383 |
| | | | 192/41 R |

* cited by examiner

DOUBLE CLUTCH APPARATUS FOR A TRANSMISSION

CROSS-REFERENCE TO RELATED APPLICATION

The present application claims priority to Korean Patent Application No. 10-2016-0170787 filed on Dec. 14, 2016, the entire contents of which is incorporated herein for all purposes by this reference.

BACKGROUND OF THE INVENTION

Field of the Invention

The present invention relates to a double clutch apparatus for a transmission.

Description of Related Art

An environmentally-friendly technology of a vehicle is a core technology which controls survival of a future automobile industry, and advanced vehicle makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such a future vehicle technology.

The hybrid electric vehicle is a vehicle using two or more power sources. Two or more power sources may be combined by various schemes and a gasoline engine or a diesel engine using the existing fossil fuel and a motor/generator driven by electrical energy are mixed and used as the power sources.

The DCT alternatingly activates odd-numbered shift-stages and even-numbered shift-stages by alternatingly operating two clutches, and improves continuity in torque transmission.

Such a double clutch transmission (DCT) typically shows an oil leakage while operating a piston to operate clutches, decreasing efficiency by a loss in hydraulic pressure.

In addition, such a piston operating scheme has a drawback of having difficulty in devising an efficient layout, since a control pressure may be variable by a centrifugal force and a separate structure may be required to compensate a centrifugal force.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a double clutch apparatus having advantages of effective transmission of an input torque to a driven gear for driving a mechanical hydraulic pump through an efficient route within the transmission housing without causing complexity of mechanism.

In addition, it is attempted to employ a dual slave cylinder for operating the external clutch and the internal clutch, and the load required for engaging clutches may be uniformly maintained since a centrifugal force of a control oil is not involved, as well as preventing the possibility of an oil leakage.

An exemplary double clutch apparatus for selectively transmitting a torque of an engine output shaft to first and second input shafts includes a clutch housing formed within a transmission housing and connected to the engine output shaft, an external clutch and an internal clutch radially superposed within the clutch housing and respectively connected to the first and second input shafts, and first and second operation pistons that are disposed penetrating the clutch housing and respectively operate the external clutch and the internal clutch. The exemplary double clutch apparatus further includes a dual slave cylinder formed at the transmission housing and selectively operating the first and second operation pistons, a hydraulic pump formed at a radial wall of the transmission housing and connected to a driven gear by a rotation shaft, a pump driveshaft formed as a hollow shaft coaxially disposed at an external circumference of the second input shaft without a rotational interference, the pump driveshaft being formed with a drive gear engaged with the driven gear, and a connecting shaft fixed to a radially internal end portion of the second operation piston and spline-engaged with an internal circumference of the pump driveshaft.

The dual slave cylinder may include a first slave cylinder rotatably supported by the first operation piston interposing a first bearing, and a second slave cylinder rotatably supported by the second operation piston interposing a second bearing.

The hydraulic pump may be a mechanical pump formed at the radial wall in a scheme that the rotation shaft is disposed across the radial wall such that the driven gear and the hydraulic pump are located opposite to each other with respect to the radial wall.

The pump driveshaft may be rotatably supported by the radial wall of the transmission housing interposing a bearing.

The connecting shaft may be formed as a hollow shaft disposed coaxially with and external to the second input shaft without rotational interference.

The clutch housing may be connected to the engine output shaft by a drive disk.

According to a double clutch apparatus for a transmission according to an exemplary embodiment of the present invention, the torque from the engine output shaft is effectively transmitted to the driven gear for driving the mechanical hydraulic pump through an efficient route within the transmission housing without causing complexity of mechanism.

In addition, a dual slave cylinder is employed for operating the external clutch and the internal clutch, and the load required for engaging clutches may be uniformly maintained since a centrifugal force of a control oil is not involved. Furthermore, the possibility of an oil leakage is prevented.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
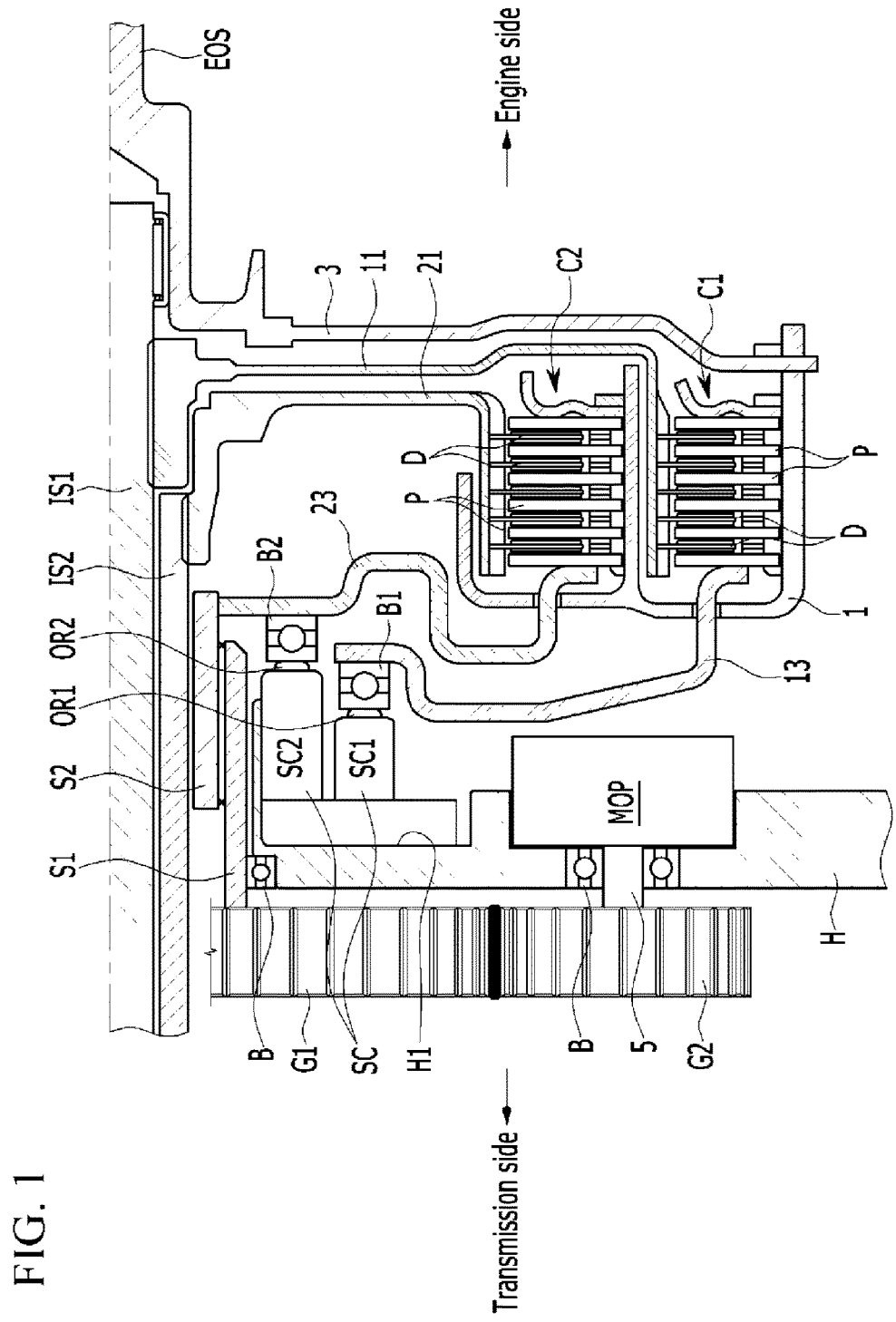
FIG. 1 is a cross-sectional view of a double clutch apparatus for a transmission according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a cross-sectional view of a double clutch apparatus for a transmission according to an exemplary embodiment of the present invention.

Referring to FIG. 1, a double clutch apparatus for a transmission according to an exemplary embodiment of the present invention receives a torque from an engine output shaft (EOS) and outputs the received torque to first and second input shafts IS1 and IS2 by selectively operating two clutches of an external clutch C1 and an internal clutch C2, such that the outputted torque may be delivered to a shifting device.

The first input shaft IS1 transmits the torque to the shifting device for odd-numbered shift-stages, and the second input shaft IS2 transmits the torque to the shifting device for even-numbered shift-stages. The second input shaft IS2 is coaxially disposed on an external circumference of the first input shaft IS1 without rotational interference.

The external clutch C1 and the internal clutch C2 selectively transmit a torque of an engine, i.e., the torque received from the engine output shaft EOS, to the first and second input shafts IS1 and IS2, respectively.

Referring to FIG. 1, a double clutch apparatus according to an exemplary embodiment of the present invention includes a clutch housing 1, first and second clutch hubs 11 and 21, and first and second operation pistons 13 and 23. The external clutch C1 and the internal clutch C2 are disposed radially internal to the clutch housing 1.

The clutch housing 1 is connected to the engine output shaft (EOS) through a drive disk 3. Inside the clutch housing 1, the external clutch C1 and the internal clutch C2 are disposed such that the external clutch C1 is external than the internal clutch C2 in a radial direction thereof.

When the external clutch C1 and the internal clutch C2 are operated, the first and second clutch hubs 11 and 21 transmit the torque of the engine output shaft EOS to the first and second input shafts IS1 and IS2.

A radially internal end portion of the first clutch hub 11 is spline-engaged with the first input shaft IS1, and a radially external end portion of the first clutch hub 11 is connected to the external clutch C1. A radially internal end portion of the second clutch hub 21 is spline-engaged with the second input shaft IS2, and a radially external end portion of the second clutch hub 21 is connected to the internal clutch C2.

The first and second operation pistons 13 and 23 may respectively be formed in a shape of a plate having a ring-shaped end portion. The first operation piston 13 corresponds to the external clutch C1 and the second operation piston 23 corresponds to the internal clutch C2. The first operation piston 13 and the second operation piston 23 penetrate the clutch housing 1.

In the external clutch C1 and the internal clutch C2, clutch plates P are spline-engaged with the clutch housing 1. Clutch disks D are alternatingly disposed between the clutch plates P and spline-engaged with the first and second clutch hubs 11 and 21.

Such a double clutch apparatus according to an exemplary embodiment of the present invention further includes a dual slave cylinder SC, a hydraulic pump MOP, a pump driveshaft S1, and a connecting shaft S2. The dual slave cylinder SC includes first and second slave cylinders SC1 and SC2.

The first and second slave cylinders SC1 and SC2 are disposed on a radial wall H1 of the transmission housing H1, for example, at a location radially inward of the radial wall H1.

A first operation rod OR1 of the first slave cylinder SC1 is rotatably supported by the first operation piston 13 interposing a first bearing B1. A second operation rod OR2 of the second slave cylinder SC2 is rotatably supported by the second operation piston 23 interposing a second bearing B2.

The first and second slave cylinders SC1 and SC2 may be formed as a concentric slave cylinder (CSC).

The hydraulic pump MOP may be formed as a mechanical hydraulic pump. The hydraulic pump MOP may be formed through the radial wall H1 of the transmission housing H, wherein a rotation shaft 5 of the hydraulic pump MOP penetrates the radial wall H1 such that the hydraulic pump MOP may be connected to a driven gear G2 disposed at an opposite side.

The pump driveshaft S1 is formed as a hollow shaft and disposed coaxially with and externally to the second input shaft IS2 without rotational interference. A drive gear G1 externally gear-meshed with the driven gear G2 is formed on the pump driveshaft S1.

An external circumference of the pump driveshaft S1 is rotatably contacts a radially internal end portion of the radial wall H1 of the transmission housing H1 interposing a bearing B.

The connecting shaft S2 is formed as a hollow shaft and disposed coaxially with and externally to the second input shaft IS2 without rotational interference. The connecting shaft S2 is fixed with a radially internal end portion of the second operation piston 23. The connecting shaft S2 is spline-engaged with the pump driveshaft S1, being coaxially inserted through the pump driveshaft S1.

Figure 2:
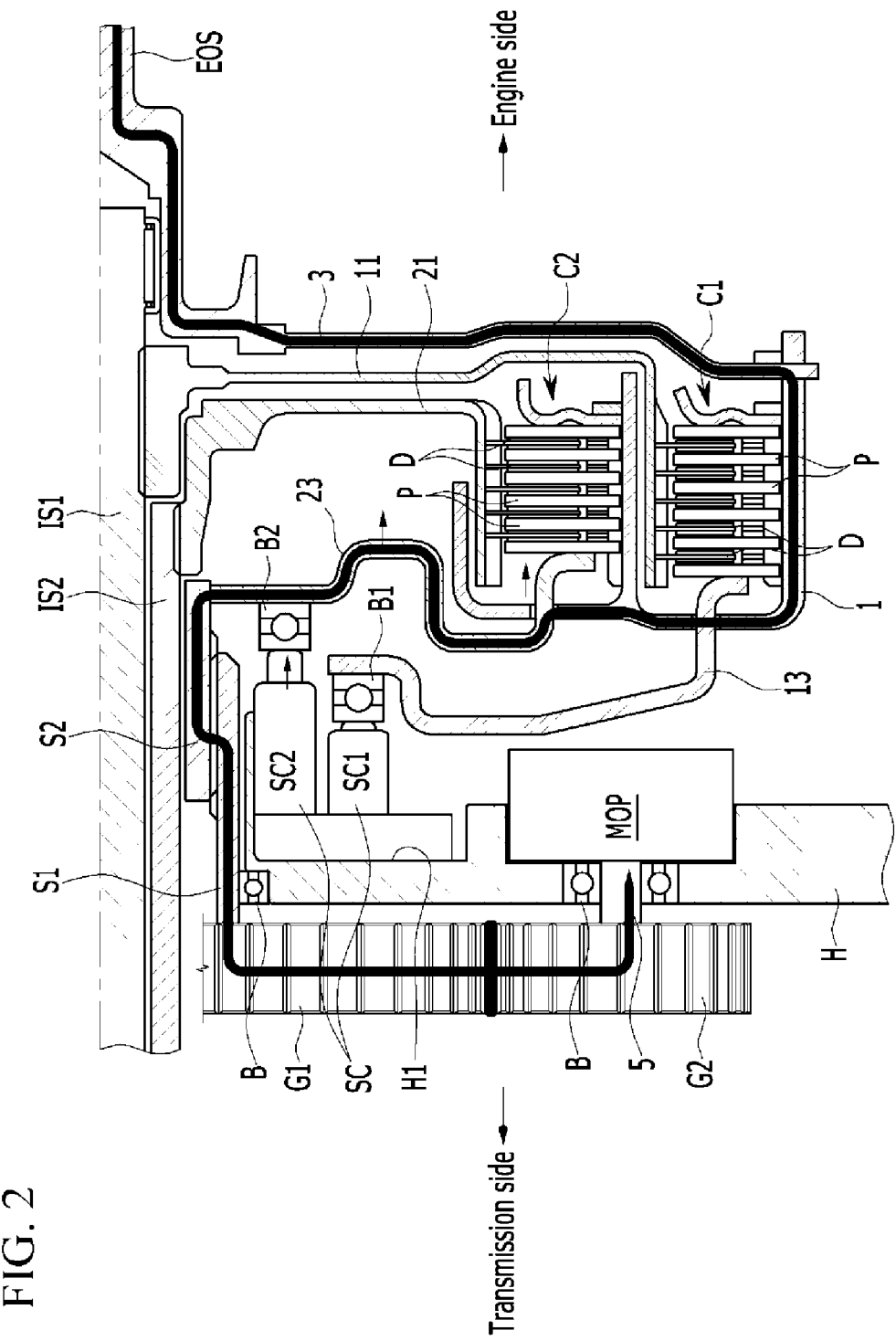
FIG. 2 is a first operational diagram of a double clutch apparatus for a transmission according to an exemplary embodiment of the present invention.
Figure 3:
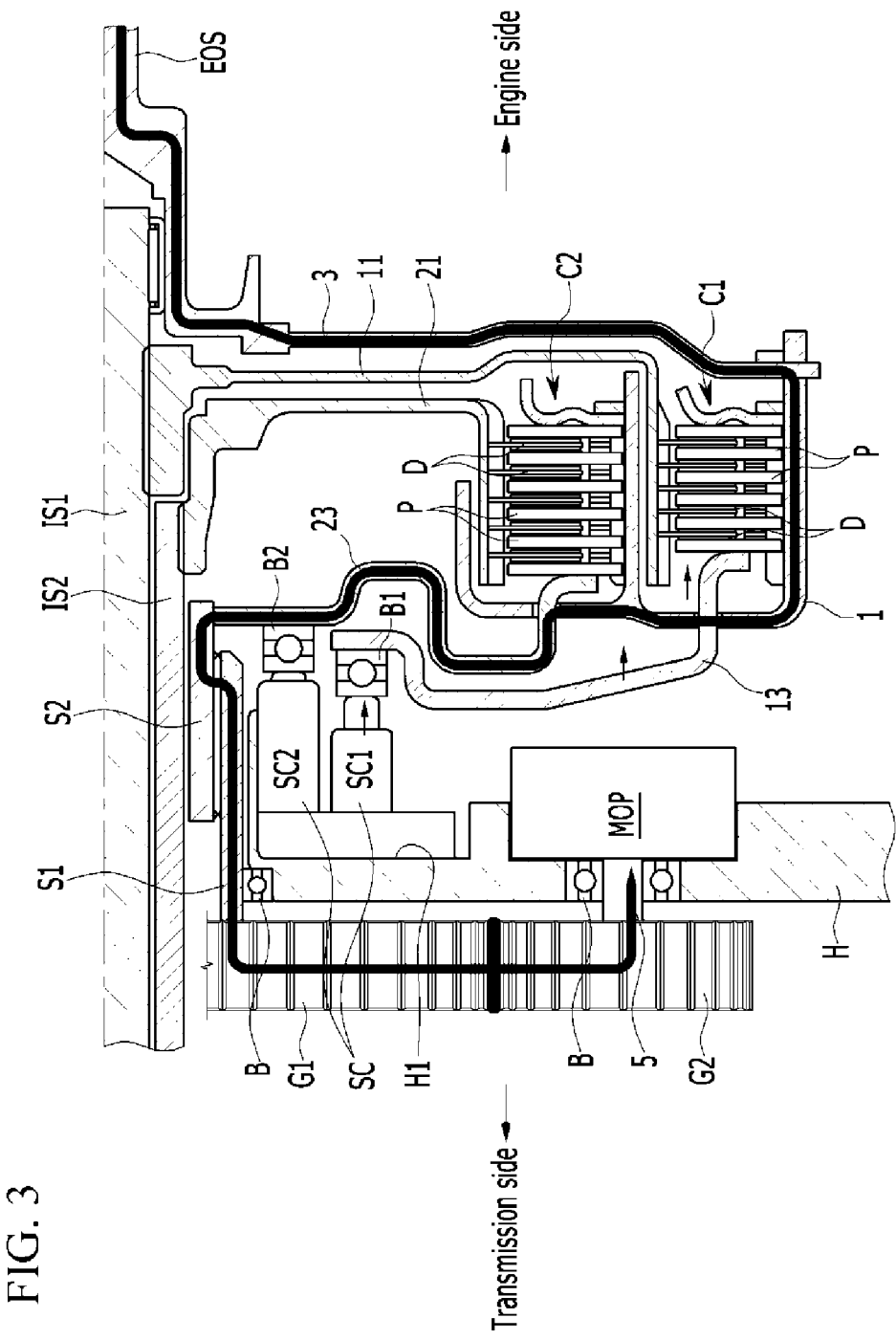
FIG. 3 is a second operational diagram of a double clutch apparatus for a transmission according to an exemplary embodiment of the present invention.

FIG. 2 is a first operational diagram of a double clutch apparatus for a transmission according to an exemplary embodiment of the present invention. FIG. 3 is a second operational diagram of a double clutch apparatus for a transmission according to an exemplary embodiment of the present invention.

A double clutch apparatus according to an exemplary embodiment of the present invention is hereinafter described in detail with reference to FIG. 2 and FIG. 3.

Referring to FIG. 2, to realize odd-numbered shift-stages, the first slave cylinder SC1 is operated to transmit the torque from the engine output shaft EOS to the first input shaft IS1.

As such, the first operation piston 13 moves in an axial direction to operate the external clutch C1. Accordingly, the torque received from the engine output shaft EOS is transmitted to the clutch housing 1 through the drive disk 3, and then transmitted to the first input shaft IS1 through the external clutch C1 and the first clutch hub 11.

Referring to FIG. 3, to realize even-numbered shift-stages, the second slave cylinder SC2 is operated to transmit the torque from the engine output shaft EOS to the second input shaft IS2.

As such, the second operation piston 23 moves in an axial direction to operate the internal clutch C2. Accordingly, the torque received from the engine output shaft EOS is transmitted to the clutch housing 1 through the drive disk 3, and then transmitted to the second input shaft IS1 through the internal clutch C2 and the second clutch hub 21.

The hydraulic pump MOP is always driven when the engine is running, regardless of whether the external clutch C1 or the internal clutch C2 is operated or not.

That is, when the engine is running, the clutch housing 1 connected to the engine output shaft EOS through the drive disk 3 rotates at a speed of the engine output shaft EOS, and the second operation piston 23 also rotates at a same speed. Therefore, the connecting shaft S2 connected to the second operation piston 23 also rotates.

In the instant case, the pump driveshaft S1 spline-engaged with the connecting shaft S2 consequently rotates rotating the drive gear G1, and accordingly, the hydraulic pump MOP is driven by the driven gear G2 gear-meshed with the drive gear G1.

According to a double clutch apparatus for a transmission according to an exemplary embodiment of the present invention, the torque from the engine output shaft EOS is effectively transmitted to the driven gear G2 for driving the mechanical hydraulic pump MOP through an efficient route within the transmission housing without causing complexity of mechanism.

In addition, a dual slave cylinder SC including first and second slave cylinders SC1 and SC2 is employed for operating the external clutch C1 and the internal clutch C2, and the load required for engaging clutches may be uniformly maintained since a centrifugal force of a control oil is not involved. Furthermore, the possibility of an oil leakage is prevented.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A double clutch apparatus for selectively transmitting a torque of an engine output shaft to first and second input shafts, the double clutch apparatus comprising:
   a clutch housing formed within a transmission housing and connected to the engine output shaft;
   an external clutch and an internal clutch radially superposed within the clutch housing and respectively connected to the first and second input shafts;
   first and second operation pistons that are disposed penetrating the clutch housing and respectively operate the external clutch and the internal clutch;
   a dual slave cylinder formed at the transmission housing and selectively operating the first and second operation pistons;
   a hydraulic pump formed at a radial wall of the transmission housing and connected to a driven gear by a rotation shaft;
   a pump driveshaft formed as a hollow shaft coaxially disposed at an external circumference of the second input shaft without a rotational interference therebetween, the pump driveshaft being formed with a drive gear engaged with the driven gear; and
   a connecting shaft fixed to a radially internal end portion of the second operation piston and spline-engaged with an internal circumference of the pump driveshaft.

2. The double clutch apparatus of claim 1, wherein the dual slave cylinder includes:
   a first slave cylinder rotatably supported by the first operation piston interposing a first bearing; and
   a second slave cylinder rotatably supported by the second operation piston interposing a second bearing.

3. The double clutch apparatus of claim 1, wherein the hydraulic pump is a mechanical pump formed at the radial wall and the rotation shaft is disposed across the radial wall, and wherein the driven gear and the hydraulic pump are located opposite to each other with respect to the radial wall.

4. The double clutch apparatus of claim 1, wherein the pump driveshaft is rotatably supported by the radial wall of the transmission housing interposing a bearing.

5. The double clutch apparatus of claim 1, wherein the connecting shaft is formed as a hollow shaft disposed coaxially with and external to the second input shaft without a rotational interference therebetween.

6. The double clutch apparatus of claim 1, wherein the clutch housing is connected to the engine output shaft by a drive disk.

7. A double clutch apparatus for a transmission for selectively transmitting a torque of an engine output shaft to first and second input shafts through an external clutch and an internal clutch respectively, the double clutch apparatus comprising:

a hydraulic pump formed at a radial wall of a transmission housing and connected to a driven gear by a rotation shaft; and a pump driveshaft formed as a hollow shaft coaxially disposed at an external circumference of the second input shaft without a rotational interference therebetween, the pump driveshaft being formed with a drive gear engaged with the driven gear;

a clutch housing formed within the transmission housing, connected to the engine output shaft interposing a drive disk, and including the internal clutch and the external clutch that are radially superposed;

first and second clutch hubs respectively spline-engaged with the first and second input shafts and respectively connected to the external clutch and the internal clutch;

first and second operation pistons that are disposed penetrating the clutch housing and respectively operate the external clutch and the internal clutch;

first and second slave cylinders formed at the transmission housing and respectively operating the first and second operation pistons;

a connecting shaft fixed to a radially internal end portion of the second operation piston and spline-engaged with an internal circumference of the pump driveshaft.

8. The double clutch apparatus of claim 7, wherein the pump driveshaft is rotatably supported by the radial wall of the transmission housing interposing a bearing.

9. The double clutch apparatus of claim 7, wherein the connecting shaft is formed as a hollow shaft disposed coaxially with and external to the second input shaft without a rotational interference therebetween.

\* \* \* \* \*